United States Patent
Todd

(10) Patent No.: US 6,229,674 B1
(45) Date of Patent: May 8, 2001

(54) COARSE AND FINE POSITIONING DEVICE EMPLOYING A SINGLE DRIVING MECHANISM

(75) Inventor: Christian Allen Todd, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/363,770

(22) Filed: Jul. 29, 1999

(51) Int. Cl.[7] ........................................ G11B 5/55
(52) U.S. Cl. ................................ 360/261.1; 360/291
(58) Field of Search ......................... 360/75, 77.12, 360/78.02, 261.1, 261.2, 261.3, 271, 291

(56) References Cited

U.S. PATENT DOCUMENTS

| | | | |
|---|---|---|---|
| 4,028,735 | 6/1977 | Miyazaki | 360/106 |
| 5,191,495 | 3/1993 | Takahara | 360/106 |
| 5,371,636 | * 12/1994 | Nayak et al. | 360/75 |
| 5,434,732 | * 7/1995 | Schwarz et al. | 360/109 |
| 5,438,469 | * 8/1995 | Rudi | 360/76 |
| 5,450,257 | * 9/1995 | Tran et al. | 360/76 |
| 5,519,554 | * 5/1996 | Todd et al. | 360/106 |
| 5,566,039 | * 10/1996 | Spicer | 360/106 |
| 5,661,616 | 8/1997 | Tran et al. | 360/77.12 |
| 5,901,008 | * 5/1999 | Nayak et al. | 360/78.02 |
| 5,923,494 | * 7/1999 | Arisaka et al. | 360/78.02 |
| 5,949,619 | * 9/1999 | Eckberg et al. | 360/106 |
| 6,043,958 | * 3/2000 | Kaaden et al. | 360/109 |
| 6,075,678 | * 6/2000 | Saliba | 360/106 |

FOREIGN PATENT DOCUMENTS 5-342544 * 12/1993 (JP) .

* cited by examiner

*Primary Examiner*—Jefferson Evans
(74) *Attorney, Agent, or Firm*—Brooks & Kushman P.C.

(57) ABSTRACT

A read-write head positioning device and method of operation that provide coarse and fine positioning using only one actuator. The read-write head is mounted on a carriage. The carriage is resiliently mounted to a moving frame. The moving frame is slidably mounted to a fixed frame. A detent mechanism disposed between the fixed frame and moving frame provides coarse positioning of the moving frame in several discrete positions relative to the fixed frame. An actuator disposed between the fixed frame and carriage provides for fine positioning of the transducer. To change coarse positions, the actuator drives the carriage in the desired direction to engage a mechanical stop on the carriage with a stop abutment on the moving frame. The actuator then continues to drive the carriage and the moving frame in the desired direction causing the detent mechanism to release from its current coarse position. When the detent mechanism captures the moving frame in the desired coarse position, the actuator backs the mechanical stop away from the stop abutment and resumes fine positioning operations.

18 Claims, 4 Drawing Sheets

COARSE AND FINE POSITIONING DEVICE EMPLOYING A SINGLE DRIVING MECHANISM

TECHNICAL FIELD

This invention relates to the field of tape media read-write head positioning devices.

BACKGROUND ART

Read-write head positioning devices used in magnetic tape drives to align the read-write head with data in the magnetic tape often incorporate a two-actuator design. One actuator provides coarse positioning to move the read-write head between data bands. The other actuator provides fine positioning to maintain alignment between the read-write head and the data tracks. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds. However, most stepper motors lack the accuracy and bandwidth necessary to maintain alignment between the read-write head and the data tracks as the magnetic tape moves across the face of the read-write head.

The fine positioning actuator is typically a voice coil mounted on the linear stage and held at a rest position by some type of spring. A voice coil actuator provides micron to submicron precision positioning at a bandwidth of hundreds to thousands of hertz. However, a single voice coil and spring combination that can meet the fine positioning requirements across the full width of the tape is expensive and unnecessary.

The combination of coarse positioning and fine positioning is desired to meet the requirements associated with reading and writing on the magnetic tapes. Current solutions involve two actuators, their respective controllers, and a significant amount of hardware. What is desired is a simpler positioning device that requires only one actuator and minimal hardware.

DISCLOSURE OF INVENTION

The present invention is a coarse and fine transducer positioning device employing a single actuator. A carriage transports the transducer relative to a moving frame. The moving frame transports the carriage relative to a fixed frame. A detent mechanism disposed between the fixed frame and moving frame provides coarse positioning of the moving frame at several discrete positions relative to the fixed frame. One or more resilient members bias the carriage toward a rest position relative to the moving frame. The single actuator is disposed between the carriage and fixed frame to provide fine positioning of the carriage, and thus the transducer. Coarse position movement is achieved by first driving carriage in the desired direction to engage mechanical stops on the carriage with stop abutments on the moving frame. Next, the actuator drives the carriage further causing the detent mechanism to release the moving frame. Coarse position movement is halted when the detent mechanism captures at the desired discrete position.

Variations of the present invention are created by disposing the actuator, resilient member, detent mechanism, and stop abutments at different positions. In one embodiment, the actuator is disposed between the carriage and moving frame and the stop abutments are part of the fixed frame. In another embodiment, the actuator and resilient member are disposed between the fixed frame and the moving frame, the detent mechanism is disposed between the moving frame and the carriage, and the stop abutments are part of the fixed frame.

A voice coil is used as the single actuator in the preferred embodiment of the present invention. Coarse and fine positioning may be achieved by varying the current through the voice coil's winding. The resilient members are thin metal flexures in the preferred embodiment. The flexures allow for submicron movement and are insensitive to debris that may collect on the positioning device.

Accordingly, it is an object of the present invention to provide an apparatus and a method for providing coarse positioning and fine positioning for a transducer using a single actuator.

These and other objects, features and advantages will be readily apparent upon consideration of the following detailed description in conjunction with the accompanying drawings.

BEST MODE FOR CARRYING OUT THE INVENTION

The present invention uses a moving frame and a detent mechanism to provide coarse positioning of the moving frame, a carriage riding on the moving frame, and a transducer riding on the carriage. Fine positioning of the carriage and transducer is achieved by moving the carriage relative to the moving frame using a single actuator. Coarse position movement is achieved by pushing the moving frame with the carriage.

Figure 1:
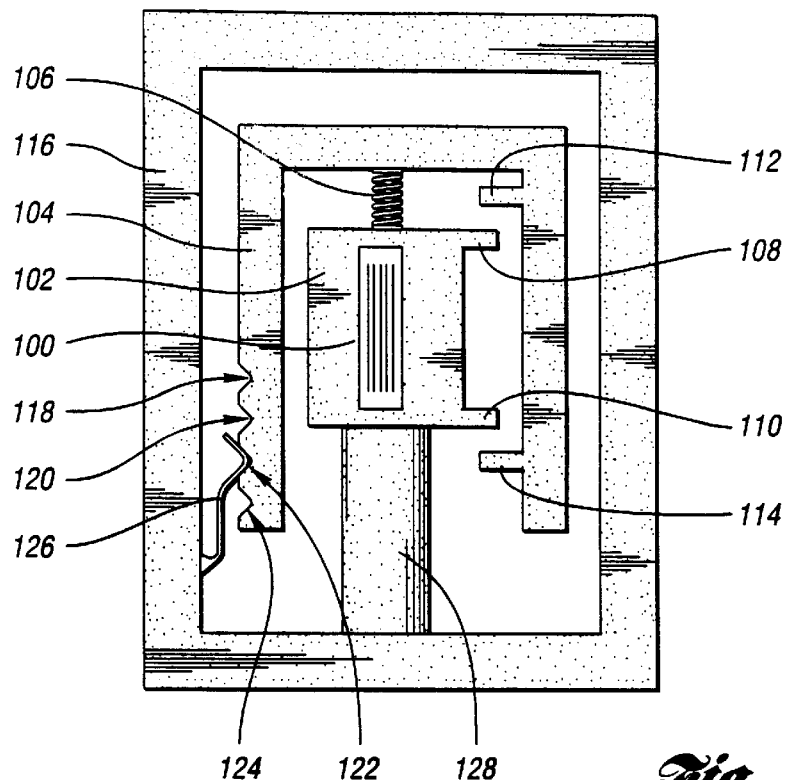
FIG. 1 is a side view of a first embodiment of the present invention.

FIG. 1 is a side view of a first embodiment of the transducer positioning device in accordance with the present invention. The transducer 100 is mounted on a carriage 102. Carriage 102 is coupled to a moving frame 104 through a resilient member 106. Carriage 102 has two mechanical stops 108 and 110 that are positioned near two stop abutments 112 and 114 of the moving frame 104 respectively. Mechanical stops 108 and 110, and stop abutments 112 and 114 transfer force from the carriage 102 to the moving frame 104 when engaged during coarse position movements. The moving frame 104 is attached to a fixed frame 116 through a detent mechanism. Multiple detent notches 118–124 in the moving frame 104, and a click 126 attached to the fixed frame 116 form the detent mechanism. Detent notches 118–124 create four discrete positions that coarsely align the transducer 100 with four respective data bands on a tape medium (not shown). More or fewer detent notches 118–124 may be used to match the number of data bands accordingly. Actuator 128 is disposed between the carriage 102 and the fixed frame 116 to provide coarse position and fine position movement.

Figure 2:
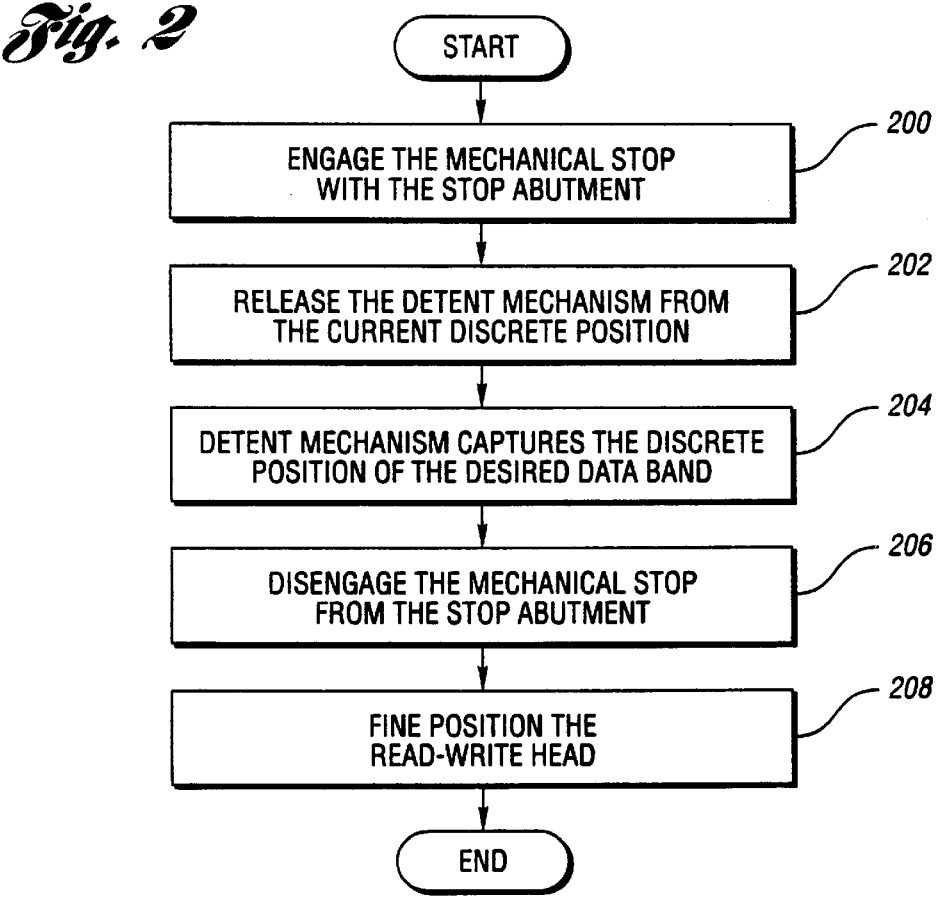
FIG. 2 is a flow diagram of a process for coarse and fine positioning the carriage and the transducer.

A process for positioning of the transducer 100 with respect to the fixed frame 116 is shown in FIG. 2. Coarse positioning starts with actuator 128 changing its displacement to drive the carriage 102 in a desired direction. This movement of the carriage 102 causes the appropriate mechanical stop 108 or 110 to engage with the respective stop abutment 112 or 114, as shown in block 200. Driving carriage 102 further in the desired direction applies a force on the moving frame 104 in the desired direction. The force on the moving frame 104 in turn, causes the detent mechanism to release from the current discrete position, as shown in block 202. Actuator 128 continues to drive the carriage 102 and moving frame 104 in the desired direction until the click 128 captures in the detent notch 118–124 associated with the desired data band, as shown in block 204. Coarse positioning ends when power to the actuator 128 is reduced causing the mechanical stop 108 or 110 to disengage from the respective stop abutment 112 or 114, as shown in block 206. With the carriage 102 re-centered in the moving frame 104, actuator 128 fine positions the carriage 102 and transducer 100, as shown in block 208.

In the embodiment shown in FIG. 1, the detent mechanism holds the carriage 102 at several discrete coarse positions relative to the fixed frame 116. These different coarse positions require the actuator 128 and resilient member 106 to meet the fine positioning precision requirement across a wide range of actuator displacements. In particular, actuator 128 must be capable of finely positioning the carriage 102 when the click 126 is seated in the detent notch 118, when the click 126 is seated in the detent notch 124, and when the click 126 is seated in all detent notches in between.

Figure 3:
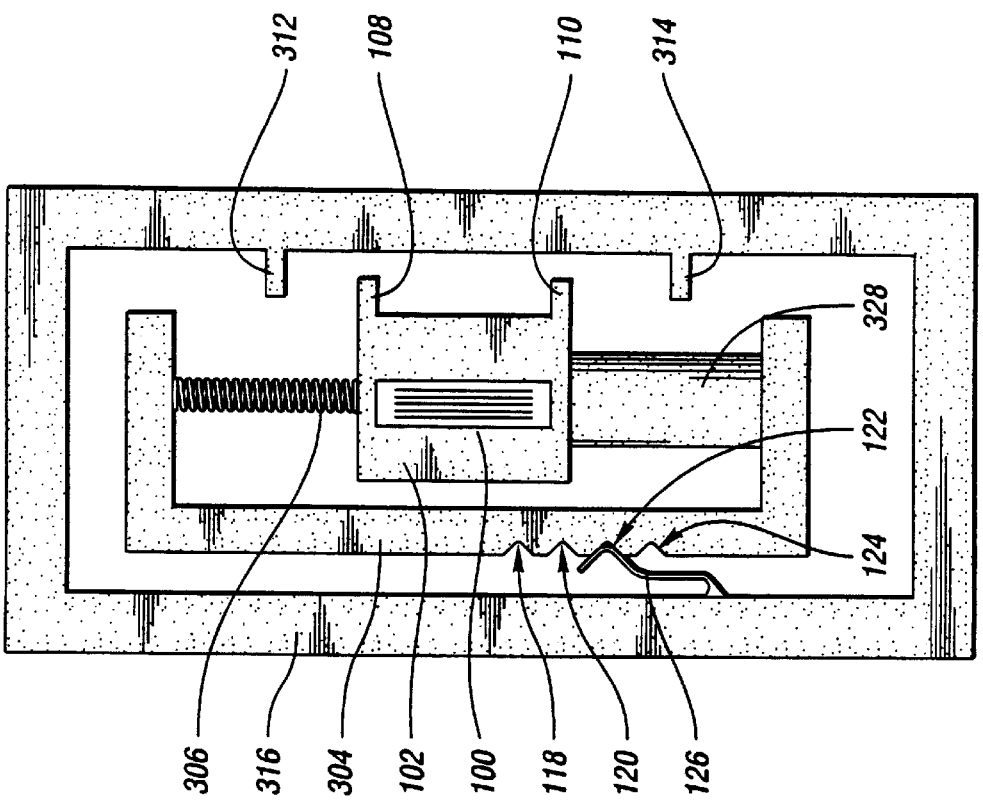
FIG. 3 is a side view of an alternate embodiment of the present invention.

FIG. 3 shows an alternate embodiment where the actuator 328 and resilient member 306 are required to meet the fine positioning requirement about only one rest position. In this embodiment, the actuator 328 is disposed between the carriage 102 and the moving frame 304, instead of between the carriage 102 and fixed frame 316. Resilient member 306 will cause the de-energized actuator 328 to have the same rest position displacement no matter which detent notch 118–124 has captured the click 126.

One tradeoff for a simpler actuator 328 is an increased size of the moving frame 304 in the lateral direction of the tape medium (not shown) to fit the actuator 328. Another tradeoff is an increased amount of time required to move from one data band to another data band. To change discrete positions of the detent mechanism, the actuator 328 must first engage a mechanical stop 108 or 110 with a respective stop abutment 312 or 314 on the fixed frame 316. With the carriage 102 held in place by the stop abutment 312 or 314, the actuator can force the moving frame 304 to change coarse positions. This arrangement requires the stop abutments 312 and 314 to be positioned beyond the desired data center-line of the outer data bands. Consequently, each coarse adjustment starts with the carriage 302 moving laterally beyond the data center-line in the outer bands, and ends with the carriage 302 returning to the data center-line of the desired band. When the transducer 100 is near one edge of the tape medium, a coarse movement toward that edge requires almost two full transitions across the width of the tape medium. Consider, for example, moving the transducer 100 from a third band to a fourth band of a four tape medium. First, the transducer 100 must traverse across the second band and then the first band to engage the proper mechanical stop with the respective stop abutment. Next, the moving frame 304 is repositioned to align with the fourth band. Afterwards, the transducer 100 must traverse back across the first band, the second band and the third band before it reaches the fourth band.

Figure 4:
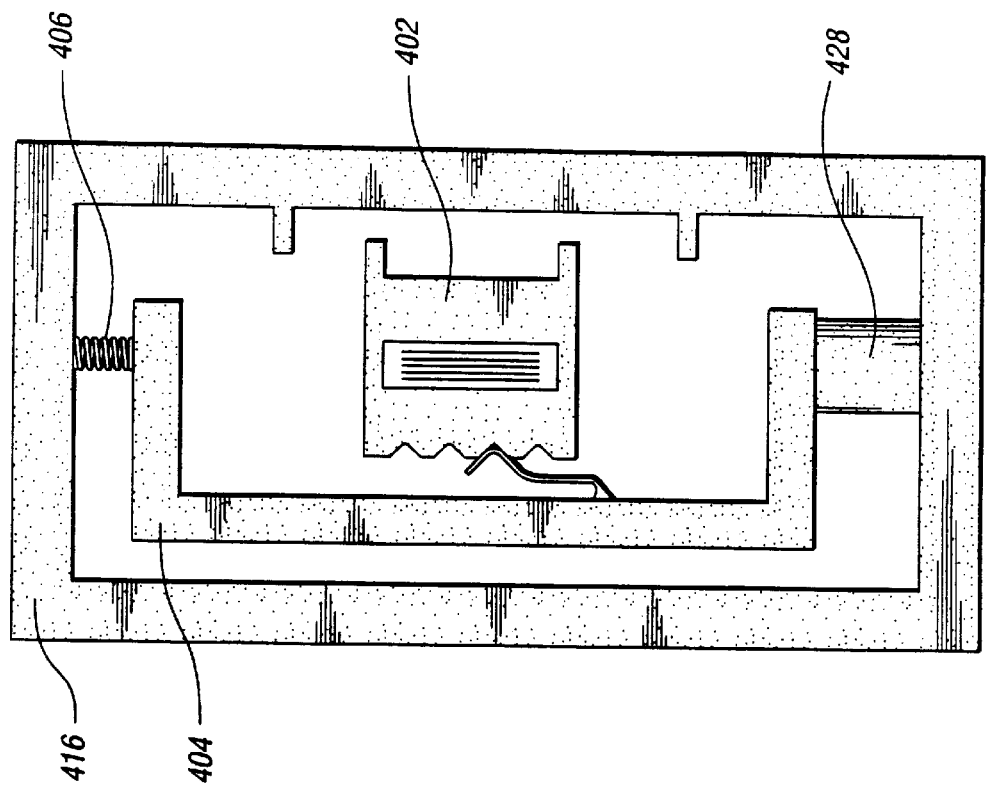
FIG. 4 is a side view of a third embodiment of the present invention.

FIG. 4 shows another embodiment of the present invention where the detent mechanism is disposed between the moving frame 404 and the carriage 402, and the actuator 428 and resilient member 406 are disposed between the moving frame 404 and the fixed frame 416. Operations of this embodiment are the same as the embodiment shown in FIG. 3. One advantage of the embodiment shown in FIG. 4 over that shown in FIG. 3 is that the weight of the actuator 428 is carried by the fixed frame 416 instead of by the detent mechanism.

Figure 5:
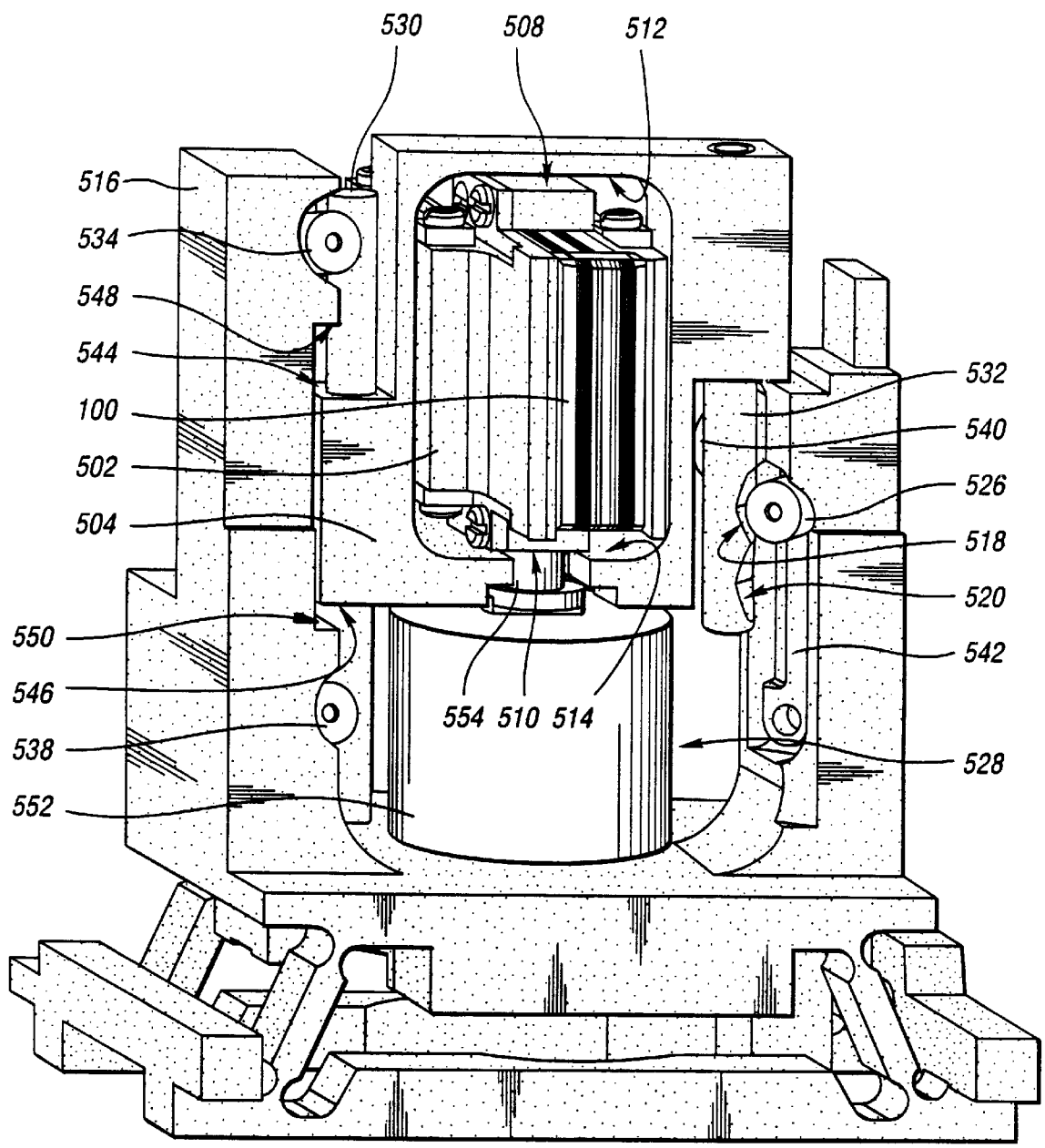
FIG. 5 is a perspective view of the preferred embodiment as seen from the tape side of the transducer.
Figure 6:
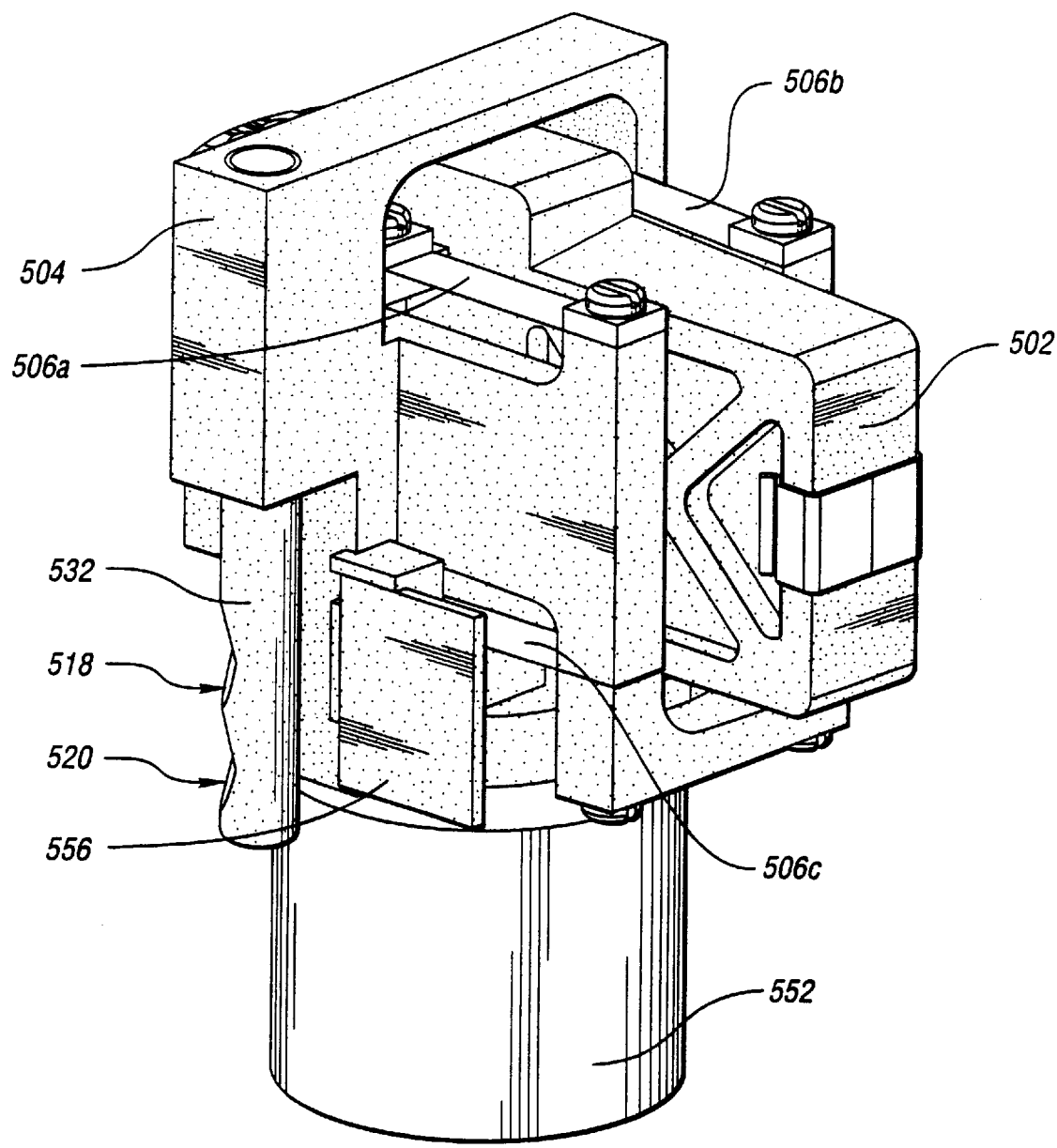
FIG. 6 is a partial perspective view of the preferred embodiment showing the flexures.

The preferred embodiment of the present invention is shown in FIG. 5 and FIG. 6. FIG. 5 is a perspective view as seen from the tape medium (not shown) side. FIG. 6 is a perspective view as seen from the opposite side and does not include the fixed frame. The basic mechanics of this embodiment are similar to that shown in FIG. 1. This preferred embodiment allows for transducer movement between data bands on the order of fifty to one hundred milliseconds, and a fine positioning bandwidth on the order of six hundred hertz.

Referring to FIG. 5, the transducer 100 is mounted on the carriage 502. The resilient member is four flexures 506a–506c (visible in FIG. 6) and 506d (not shown) connecting the carriage 502 to the moving frame 504. The flexures 506a–506d are made of thin metal strips that allow the carriage 502 to be displaced laterally (as defined by the tape medium) but not longitudinally with respect to the moving frame 504. The flexures 506a–506d also allow for submicron movement in the presence of dust and debris that can accumulate on their surfaces. Sometimes, the flexures 506a–506d are referred to as leaf springs or cantilevered leaf springs. Mechanical stops 508 and 510 are the top and bottom surfaces respectively of the carriage 502. Stop abutments 512 and 514 are inside surfaces of the moving carriage 504 opposite the mechanical stops 508 and 510 respectively.

The moving frame 504 slides relative to the fixed frame 516 on two rails 530 and 532 are guided by several guide bearings 534, 536 (not shown), 538, 539 (not shown), and 540. These guide bearings 534–540 are rotatably mounted to the fixed frame 516. A sixth bearing 526 is attached to the fixed frame 516 by a load arm 542 and acts as both a guide bearing and the click. Two detent notches 518 and 520 in rail 532 define two discrete positions for coarse positioning of the transducer 100.

Additional mechanical stops 544 and 546 and stop abutments 548 and 550 are defined on surfaces of the moving frame 504 and fixed frame 516 respectively. The mechanical stops 544–546 and the stop abutments 548–550 mechanically limit the range of motion of moving frame 504 with respect to the fixed frame 516. This keeps the rails 530 and 532 in contact with the guide bearings 534–540 and the sixth bearing 526.

The actuator in the preferred embodiment is a voice coil 528. Voice coil 528 comprises a permanent magnet 552 surrounding a winding (not shown) mounted on a rod 554. Permanent magnet 552 is attached to the fixed frame 516. Rod 554 is attached directly to the carriage 502. The longitudinal length of the permanent magnet 552 is sufficient to allow the winding to remain inside a uniform magnetic field when the sixth bearing 528 is in either detent notch 518 or 520. This gives the voice coil 528 the same fine positioning characteristics at both coarse positions.

Referring to FIG. 6, a glass scale 556 is mounted on the moving frame 504 and an associated sensor (not visible) is mounted on the fixed frame 516 to provide feedback into the servo system controller (not shown). The glass scale 556 and associated sensor inform the servo system controller in which detent notch 518–520 that the sixth bearing 526 is resting. This information in turn, identifies the data band in the tape medium that is coarsely aligned with the transducer 100

Many variations on the detent mechanism and actuator are possible within the scope of the present invention. For example, the detent notches and click placement may be reversed. Referring back to FIG. 1, the detent notches may be part of the fixed frame while the click is attached to the moving frame. The detent notches may be replaced by detent bosses, holes, and other shapes. The click may be a resilient metal strip, a bearing at the end of a load arm, a ball biased into the detent notches, and other configurations known in the art. Other types of actuators may also be used such as a moving iron, electrostatic, piezoelectric and the like. Variations of a voice coil actuator may also be employed. For example, the voice coil may have two windings, one winding to produce fine position movement, and another winding to produce coarse position movement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for positioning a transducer comprising:
   a fixed frame;
   a moving frame slidably mounted to the fixed frame, the moving frame having two stop abutments;
   a detent mechanism disposed between the fixed frame and the moving frame, the detent mechanism defining a plurality of discrete positions of the moving frame relative to the fixed frame;
   a carriage having the transducer mounted thereon, the carriage having two mechanical stops disposed to engage the two stop abutments of the moving frame;
   at least one resilient member disposed between the carriage and the moving frame resiliently coupling the carriage to the moving frame; and
   an actuator disposed between the carriage and the fixed frame, the actuator being operative to move the moving frame to a selected discrete position of the plurality of discrete positions and to move the carriage relative to the moving frame in the selected discrete position.

2. The apparatus of claim 1 wherein the actuator is a voice coil.

3. The apparatus of claim 1 wherein the at least one resilient member is at least one leaf spring.

4. The apparatus of claim 1 further comprising a sensor disposed between the fixed frame and the moving frame, the sensor being operative to detect the selected discrete position of the plurality of discrete positions.

5. An apparatus for positioning a transducer comprising:
   a fixed frame having two stop abutments;
   a moving frame slidably mounted to the fixed frame;
   a detent mechanism disposed between the fixed frame and the moving frame, the detent mechanism defining a plurality of discrete positions of the moving frame relative to the fixed frame;
   a carriage having the transducer mounted thereon, the carriage having two mechanical stops disposed to engage the two stop abutments of the fixed frame;
   at least one resilient member disposed between the carriage and the moving frame resiliently coupling the carriage to the moving frame; and
   an actuator disposed between the carriage and the moving frame, the actuator being operative to move the moving frame to a selected discrete position of the plurality of discrete positions and to move the carriage relative to the moving frame in the selected discrete position.

6. The apparatus of claim 5 wherein the actuator is a voice coil.

7. The apparatus of claim 5 wherein the at least one resilient member is at least one leaf spring.

8. The apparatus of claim 5 further comprising a sensor disposed between the fixed frame and the moving frame, the sensor being operative to detect the selected discrete position of the plurality of discrete positions.

9. An apparatus for positioning a transducer comprising:
   a fixed frame having two stop abutments;
   a moving frame;
   at least one resilient member disposed between the moving frame and the fixed frame resiliently coupling the moving frame to the fixed frame;
   a carriage having the transducer mounted thereon, the carriage being slidably mounted to the moving frame, the carriage having two mechanical stops disposed to engage the two stop abutments of the fixed frame;
   a detent mechanism disposed between the moving frame and the carriage, the detent mechanism defining a plurality of discrete positions of the carriage relative to the moving frame; and
   an actuator disposed between the moving frame and the fixed frame, the actuator being operative to move the carriage to a selected discrete position of the plurality of discrete positions and to move the moving frame relative to the fixed frame.

10. The apparatus of claim 9 wherein the actuator is a voice coil.

11. The apparatus of claim 9 wherein the at least one resilient member is at least one leaf spring.

12. The apparatus of claim 9 further comprising a sensor disposed between the carriage and the moving frame, the sensor being operative to detect the selected discrete position of the plurality of discrete positions.

13. A method for positioning a transducer disposed on a carriage, wherein the carriage is resiliently coupled to a moving frame, the carriage has two mechanical stops disposed to engage two stop abutments of the moving frame, the moving frame is coupled to a fixed frame through a detent mechanism defining a plurality of discrete positions, and an actuator is disposed between the carriage and the fixed frame for displacing the carriage, the method comprising:
   activating the actuator to displace the carriage to engage one mechanical stop of the two mechanical stops of the carriage with one stop abutment of the two stop abutments of the moving frame;
   further displacing the carriage to release the detent mechanism from a current discrete position of the plurality of discrete positions in response to the one mechanical stop engaging the one stop abutment;
   discontinuing displacement of the carriage when the detent mechanism captures in a desired discrete position of the plurality of discrete positions; and
   disengaging the one mechanical stop from the one stop abutment in response to discontinuing displacement of the carriage.

14. The method of claim 13 further comprising fine positioning the carriage within a range where the two mechanical stops of the carriage are not engaged with either of the two stop abutments of the moving frame after disengaging the one mechanical stop from the one stop abutment.

15. A method for positioning a transducer disposed on a carriage, wherein the carriage is resiliently coupled to a moving frame, the carriage has two mechanical stops disposed to engage two stop abutments of the fixed frame, the moving frame is coupled to a fixed frame through a detent mechanism defining a plurality of discrete positions, and an actuator is disposed between the carriage and the moving frame for displacing the carriage, the method comprising:

- activating the actuator to displace the carriage to engage one mechanical stop of the two mechanical stops of the carriage with one stop abutment of the two stop abutments of the fixed frame;
- further displacing the carriage to release the detent mechanism from a current discrete position of the plurality of discrete positions in response to the one mechanical stop engaging the one stop abutment;
- discontinuing displacement of the carriage when the detent mechanism captures in a desired discrete position of the plurality of discrete positions; and
- disengaging the one mechanical stop from the one stop abutment in response to discontinuing displacement of the carriage.

16. The method of claim 15 further comprising fine positioning the carriage within a range where the two mechanical stops of the carriage are not engaged with either of the two stop abutments of the fixed frame after disengaging the one mechanical stop from the one stop abutment.

17. A method for positioning a transducer disposed on a carriage, wherein the carriage is coupled to a moving frame through a detent mechanism defining a plurality of discrete positions, the carriage has two mechanical stops disposed to engage two stop abutments of a fixed frame, the moving frame is resiliently coupled to the fixed frame, and an actuator is disposed between the moving frame and the fixed frame for displacing the moving frame, the method comprising:

- activating the actuator to displace the moving frame causing one mechanical stop of the two mechanical stops of the carriage to engage with one stop abutment of the two stop abutments of the fixed frame;
- further displacing the moving frame to release the detent mechanism from a current discrete position of the plurality of discrete positions in response to the one mechanical stop engaging the one stop abutment;
- discontinuing displacement of the moving frame when the detent mechanism captures in a desired discrete position of the plurality of discrete positions; and
- disengaging the one mechanical stop from the one stop abutment in response to discontinuing displacement of the carriage.

18. The method of claim 17 further comprising fine positioning the moving frame within a range where the two mechanical stops of the carriage are not engaged with either of the two stop abutments of the fixed frame after disengaging the one mechanical stop from the one stop abutment.

* * * * *